United States Patent
Wisch et al.

(10) Patent No.: US 7,378,989 B2
(45) Date of Patent: May 27, 2008

(54) EMERGENCY LIGHTING ARRANGEMENT WITH DECENTRALIZED EMERGENCY POWER SUPPLY FOR AN AIRCRAFT

(75) Inventors: Bodo Wisch, Bremen (DE); Lars Rowold, Wiefelstede (DE)

(73) Assignee: Airbus Deutschland GmbH, Hamburg (DE)

( * ) Notice: Subject to any disclaimer, the term of this patent is extended or adjusted under 35 U.S.C. 154(b) by 129 days.

(21) Appl. No.: 11/027,562

(22) Filed: Dec. 30, 2004

(65) Prior Publication Data

US 2005/0141226 A1   Jun. 30, 2005

(30) Foreign Application Priority Data

Dec. 30, 2003   (DE) ................. 103 61 982

(51) Int. Cl.
    *B64D 47/06*   (2006.01)
(52) U.S. Cl. .................. 340/981; 340/332; 340/636.1; 340/687; 340/693.1; 340/815.4; 340/815.45; 340/815.69; 362/153; 362/470
(58) Field of Classification Search ......... 340/981, 340/693.1, 635, 636.1, 636.12, 636.13, 687, 340/425.5, 815.4, 815.45, 815.69, 332; 362/470, 362/153
    See application file for complete search history.

(56) References Cited

U.S. PATENT DOCUMENTS

| | | | | |
|---|---|---|---|---|
| 4,006,446 A | * | 2/1977 | White | 340/947 |
| 4,029,994 A | * | 6/1977 | Iwans | 315/323 |
| 4,347,499 A | * | 8/1982 | Burkman et al. | 340/815.69 |
| 4,521,835 A | | 6/1985 | Meggs et al. | |
| 5,225,828 A | * | 7/1993 | Walleston | 340/953 |
| 5,739,639 A | | 4/1998 | Johnson | |
| 5,782,552 A | | 7/1998 | Green et al. | |
| 5,831,413 A | | 11/1998 | Gould | |

(Continued)

FOREIGN PATENT DOCUMENTS

DE   198 43 330   3/2000

(Continued)

OTHER PUBLICATIONS

"Products in the Area of Emergency Power Supply"; (DLE) Diehl Luftfahrt Elektronik GmbH, Nuernberg, Germany; 2005; www.diehl-dle.com/en/frm.html.

(Continued)

*Primary Examiner*—Hung Nguyen
(74) *Attorney, Agent, or Firm*—W. F. Fasse; W. G. Fasse

(57) ABSTRACT

An emergency lighting arrangement preferably includes plural emergency light units connected to an on-board power supply network of an aircraft, and plural emergency current sources that each include at least one capacitor. Each emergency light unit includes an emergency light emitting element and a control unit that automatically connects the capacitor of the emergency current source to the emergency light emitting element upon the failure of the on-board power supply network. Preferably, the emergency current source including the capacitor is integrated into the emergency light unit. The emergency light unit may further include normal operation light emitting elements selectively connected by the control unit to the on-board power supply network. The control unit switches between normal operation of the normal light emitting elements and charging of the capacitor, and emergency operation in which the capacitor discharges through the emergency light emitting element.

20 Claims, 3 Drawing Sheets

U.S. PATENT DOCUMENTS

| | | | |
|---|---|---|---|
| 5,850,113 | A | 12/1998 | Weimer et al. |
| 6,203,180 | B1 | 3/2001 | Fleischmann |
| 6,404,170 | B2 | 6/2002 | Okamura et al. |
| 2002/0180268 | A1 | 12/2002 | Mattes |
| 2003/0026092 | A1 | 2/2003 | Reese et al. |
| 2006/0044801 | A1 | 3/2006 | Schweigert |

FOREIGN PATENT DOCUMENTS

| | | |
|---|---|---|
| DE | 696 10 504 | 6/2001 |
| EP | 0 999 095 | 5/2000 |
| JP | 10-340606 | 12/1998 |
| WO | WO 91/11896 | 8/1991 |
| WO | WO 95/26833 | 10/1995 |
| WO | WO 2004/082097 | 9/2004 |

OTHER PUBLICATIONS

"Power Conversion, Emergency Battery Power Supply Units"; Page Aerospace Limited, Sunbury, UK; 2005; www.pageaerospace.com/power.htm.

* cited by examiner

EMERGENCY LIGHTING ARRANGEMENT WITH DECENTRALIZED EMERGENCY POWER SUPPLY FOR AN AIRCRAFT

PRIORITY CLAIM

This application is based on and claims the priority under 35 U.S.C. § 119 of German Patent Application 103 61 982.8, filed on Dec. 30, 2003, the entire disclosure of which is incorporated herein by reference.

FIELD OF THE INVENTION

The invention relates to an emergency lighting arrangement for an aircraft that comprises at least one emergency light, which includes an emergency lighting (i.e. light emitting) element, and at least one emergency current source for supplying electrical current to the emergency lighting element upon the failure of an on-board electrical power supply network of the aircraft.

BACKGROUND INFORMATION

A conventional emergency lighting arrangement in an aircraft includes a number of emergency lights arranged distributed in the aircraft, as well as one or more emergency current supply units having rechargeable batteries that supply electrical current to the emergency lights in the event of a failure of the on-board electrical power supply network of the aircraft. Such emergency current supply units are conventionally known under the name Emergency Power Supply Units (EPSUs), for example from references and sources such as http://www.diehl-dle.com/en/frm.html or http://www.pageaerospace.com.

Depending on the storage capacity of the rechargeable batteries, such a conventional emergency current supply unit can supply electrical power to a certain limited number of the emergency lights. Typically, several or many emergency lights are connected to a single emergency current supply unit by suitable cabling. The rechargeable batteries must be regularly tested and occasionally replaced or exchanged due to their limited operating lifetime, which leads to a considerable inspection and maintenance effort and time expenditure. Also for this reason, the battery-powered emergency current supply units can only be installed at certain locations within the aircraft, namely locations that allow an easy access for the purpose of testing, inspection and replacement of the batteries, for example behind a maintenance panel or door.

A further disadvantage of the conventional arrangement is that the battery-powered emergency current units have a relatively high weight, for example because the batteries have a relatively high ratio of weight to storage capacity. Furthermore, when a plurality of emergency lights are to be connected to a single emergency current supply unit, this requires a complicated cabling arrangement that adds to the total system weight. Nonetheless, such a cabling arrangement is necessary to ensure a remaining adequate functionality of as much of the emergency lighting arrangement as possible, for example after the occurrence of an assumed cabin rupture that may break or interrupt at least some of the emergency current supply cables.

The US Patent Application Publication US 2003/0026092 A1 discloses a portable rechargeable blinking light, that is particularly adapted to be installed or mounted as a convenience light or lamp in a motor vehicle. A capacitor is provided as an independent current supply, whereby the supply of electrical current from the capacitor to the light emitting element can be switched on or off as desired by the user by means of a switch provided for this purpose.

SUMMARY OF THE INVENTION

In view of the above, it is an object of the invention to provide an emergency lighting arrangement for an aircraft, in which the maintenance effort and expenditure are reduced while the system reliability is improved in comparison to the prior art. A further object of the invention is to provide a weight-optimized construction of the arrangement especially for installation thereof in an aircraft. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an emergency lighting arrangement for an aircraft that includes an on-board power supply network. The emergency lighting arrangement comprises:
  at least one emergency light emitting element; and
  at least one emergency current source respectively including at least one capacitor and a controller that is connected between the at least one capacitor and the at least one emergency light emitting element;
  wherein the controller is adapted to be connected to the power supply network to detect whether operating power is available from the power supply network, and the controller is adapted to automatically connect the at least one emergency light emitting element to the at least one capacitor to power the at least one emergency light emitting element with electrical energy stored in the at least one capacitor when the operating power is not available from the power supply network.

The above objects have further been achieved in a particular preferred embodiment according to the invention in an aircraft having an on-board power supply network and a plurality of emergency light units arranged distributed in the aircraft. This embodiment of the invention provides an improvement wherein:
  each one of the emergency light units respectively comprises, incorporated therein as a unit, at least one emergency light emitting element, at least one capacitor, and a controller that is connected to the power supply network, the at least one capacitor, and the at least one emergency light emitting element;
  the controller is adapted to selectively switch between a normal mode when operating power is available from the power supply network and an emergency mode when the operating power is not available from the power supply network;
  the controller includes a charging circuit adapted to charge the at least one capacitor using the operating power in the normal mode; and
  the controller further includes a switching circuit adapted to disconnect the at least one emergency light emitting element from the at least one capacitor in the normal mode and connect the at least one emergency light emitting element to the at least one capacitor in the emergency mode.

Thus, the invention has especially achieved the above objects in that the emergency current supply source comprises at least one capacitor for storing the electrical energy necessary for the emergency operation of the emergency lighting element (i.e. light emitting element). Throughout this specification, the term "light emitting element" is defined broadly to encompass any element that is electrically powered and gives off or emits visible light, including incandescent lightbulbs, fluorescent lamps, light emitting diodes, and electroluminescent elements, for example.

Through the use of capacitors as electrical storage devices, it is possible to completely omit rechargeable batteries, which have a relatively high maintenance requirement. In this regard, the capacitors are essentially maintenance free, which is understood to mean that on average the capacitors require no maintenance over the average operating lifetime of a high capacity commercial passenger transport aircraft. For this reason, in connection with a plurality of emergency lights distributed in an aircraft, it is preferably possible to allocate an individual emergency current source respectively to each emergency light. In other words, each emergency light is individually connected to its own emergency current source, without thereby increasing the overall system maintenance requirement, because the capacitors do not require any maintenance. In this manner, the length of the electrical conductor lines extending between the emergency current source and the light emitting element (or elements) associated therewith can be considerably reduced, which achieves a reduction of the overall system weight and a simplification of the installation. In that regard, the emergency light no longer requires external connections for emergency current supply lines.

A further advantage is that upon the failure of a given emergency current source, only the single individual emergency light (for example) connected to this particular failed emergency current source will thereby be impaired. In other words, the failure of an emergency current source will no longer impair the operability of many emergency lights, but rather only a single emergency light (or a few emergency lights) connected thereto. Still further, a complicated and expensive cabling arrangement for ensuring the greatest possible widespread emergency illumination in the aircraft can also be avoided.

Through the use of capacitors instead of rechargeable batteries for the emergency power supply, the invention achieves an overall weight reduction of the emergency lighting system in the vehicle, e.g. particularly the aircraft, in which the emergency lighting system is installed. Furthermore, since each emergency light unit can include a control unit that automatically switches on the light emitting element or elements of the emergency light unit in the event of the failure or lack of power being supplied from the on-board power network, an emergency lighting of the aircraft or other vehicle in the event of an emergency is surely and reliably provided in an automatic manner, without requiring a manual operation or actuation thereof. Also, this function of the emergency light emitting elements, namely the emergency operation upon the failure of the on-board power network, is thereby reliably ensured, which also increases the safety of the passengers. The escape paths are maximally illuminated, which helps to satisfy the requirements for a rapid emergency evacuation.

Preferably, the storage capacity (and thus the capacitance) of the capacitor in a respective emergency light unit is sufficient to operate the emergency light emitting element or elements of this emergency light unit for at least 300 seconds, or preferably at least 600 seconds. This ensures an adequate emergency lighting duration to enable the safe evacuation or exiting of all passengers from the vehicle, e.g. the aircraft. Preferably, the emergency light emitting elements are designed or adapted to be operated with a voltage lower than that of the normal operating voltage of the on-board power supply network, in order to reduce the storage capacity of the capacitor needed to achieve a certain operating duration of the emergency lighting elements, and thereby also to reduce the dimensions and the weight of the capacitor. For the same reason, the power consumption of the emergency lighting elements is preferably as low as possible while providing the required light output. Also for this reason, the light emission efficiency of the emergency lighting elements should be as high as possible. Preferably, the emergency lighting elements can be light emitting diodes (LEDs).

In an advantageous embodiment, the inventive emergency lighting arrangement includes a plurality of emergency light units distributed in an aircraft, whereby each emergency light unit has its own respective emergency current source allocated to it. This is not absolutely necessary, however. Namely, a given emergency current source could be allocated and connected respectively to a plurality of emergency light units. This aspect is especially significant in connection with the retrofitting of previously existing aircraft, wherein the previous conventional emergency current sources using rechargeable batteries are replaced by inventive emergency current sources based on capacitors.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
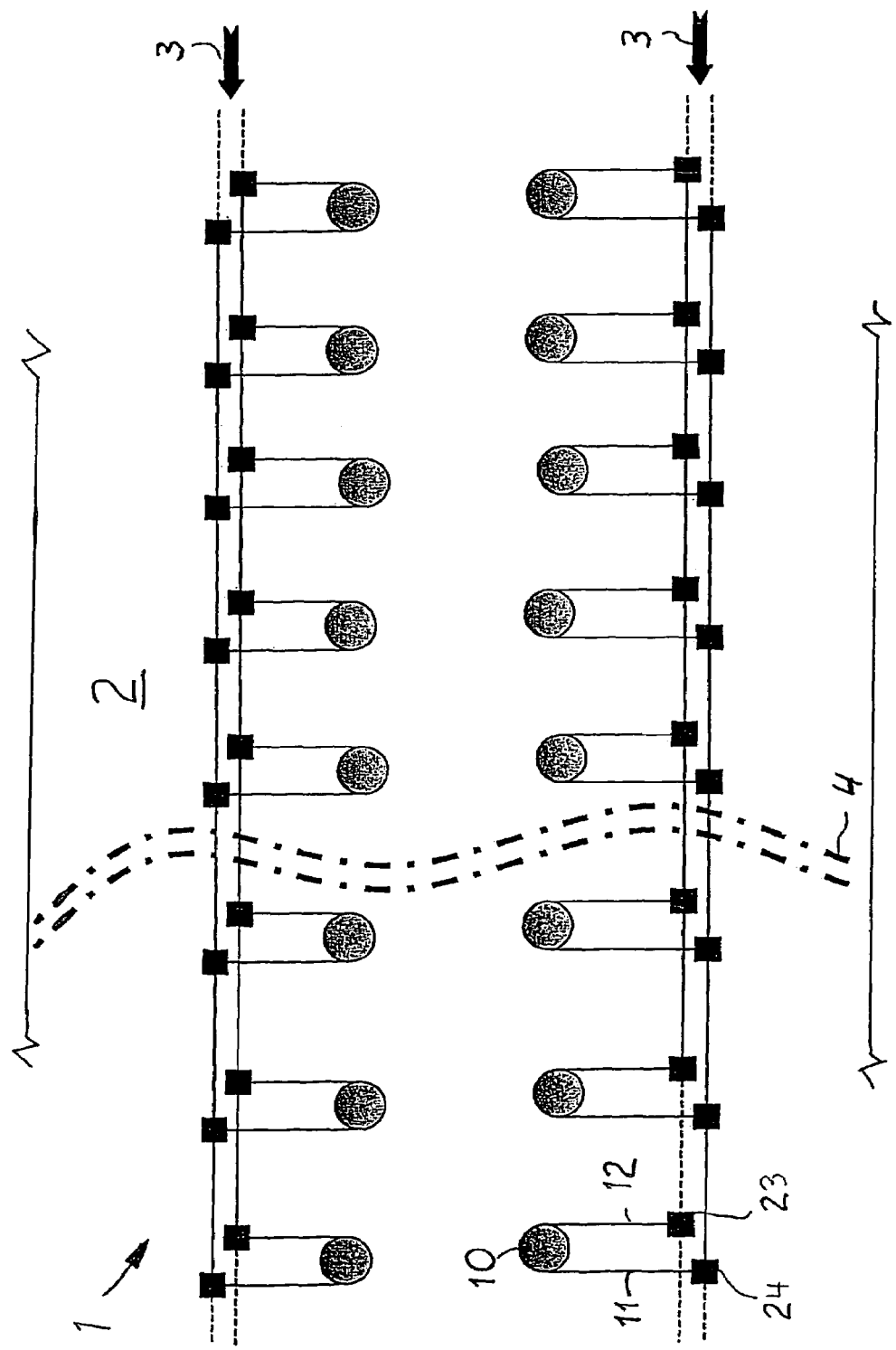
FIG. 1 is a schematic plan of an emergency lighting arrangement according to the invention in an aircraft.

FIG. 1 schematically shows a first embodiment of an emergency lighting arrangement 1 including a plurality of emergency light units 10 arranged distributed in a passenger cabin 2 of an aircraft or other vehicle, and connected to an on-board electrical power supply network or grid 3. Each emergency light unit 10 is connected via two power supply connection lines 11 and 12 to two respective conductors or power buses of the on-board power supply network 3 via respective plugs, terminals or other connections 23 and 24. In this regard, the power supply connection line 11 may carry the typical on-board operating DC voltage potential, for example 28 V, while the connection line 12 carries the 0 V return potential (DC RTN) for example. The opposite polarity or connection is alternatively possible, as will be discussed below.

If the on-board power supply network 3 is fully functional and providing electrical power to the connected emergency light units 10, then the light units 10 can be operated, i.e. illuminated, using the electrical power supplied by the on-board network 3. However, the emergency lighting arrangement 1 must also remain functional even in the event of a partial or total failure of the normal power supply through the on-board network 3. For example, to comply with pertinent safety regulations, it must be demonstrated to the regulating authorities, that at least 75% of the emergency light units 10 will remain functional in the event of an emergency landing even with a possible rupture/separation 4 of the aircraft fuselage, which breaks or interrupts the normal power supply network 3. For this reason, the invention provides decentralized emergency current supply units or devices distributed throughout the passenger cabin 2 along with the emergency light units 10, as will be described in detail next.

The emergency light units 10 of the emergency lighting arrangement 1 are distributed regularly throughout the passenger cabin 2 and/or throughout a freight hold or cargo compartment (not shown) of the aircraft, in order to provide sufficient lighting to allow persons to safely exit the passenger cabin and/or the freight compartment even in the event of the failure of the normal power supply and/or the normal aircraft lighting. The inventive arrangement 1 (in the present embodiment) provides independent energy storage devices directly in the emergency light units 10 themselves. These energy storage devices can independently supply the required electrical power for operating the emergency light units 10 for at least the required time of 300 seconds, which must be available for the evacuation of passengers, in the event of the failure of the on-board power supply network 3.

The details of a possible embodiment of an individual emergency light unit 10 with an integrated emergency current source according to the invention will now be described in connection with FIG. 2.

The emergency light unit 10 comprises lighting elements or light emitting elements 13 embodied as respective LEDs for the normal operation, i.e. the operation powered by the intact on-board power supply network 3 providing the normal on-board mains voltage. In this regard, the normal operation lighting elements 13 are preferably powered through a control unit 17 with the on-board DC voltage provided via the power supply connection lines 11 and 12 from the power network 3. In this regard, the normal operation lighting elements 13 are connected via first and second internal power lines 14 and 15 to the control unit 17. A suitable number of lighting elements 13 can be connected in series between the first and second internal power lines 14 and 15, and if necessary, a plurality of such series circuits of lighting elements 13 can be arranged in parallel to one another, as shown. The number and arrangement of the lighting elements 13 is simply designed based on the required lighting output and the normal on-board power supply voltage and current to be supplied through the connection lines 11 and 12.

Further in this regard, a switch 16, e.g. interposed in the power supply connection line 11, selectively connects the power supply connection lines 11 and 12 through the control unit 17 to the internal power lines 14 and 15 so that the normal operation lighting elements 13 will be supplied with the normal on-board DC voltage and thereby emit light to illuminate the interior space of the aircraft, for example a passenger cabin or a freight compartment. Through manual operation of the switch 16, the lighting elements 13 can be selectively switched on and switched off as desired during the normal operation condition, i.e. when the normal operating power is available from the power network 3.

While the above described embodiment includes normal operation lighting elements 13 incorporated in the emergency light unit 10, this is not absolutely necessary. For example, separate light units could be provided for the normal lighting operation, whereby the emergency light unit 10 would only include one or more light emitting elements intended for the emergency lighting operation.

As the above-mentioned independent and integrated emergency current supply device, the emergency light unit 10 further comprises a capacitor 18 that is also connected to the control unit 17. During normal operation in which the on-board power network 3 provides the normal operating DC voltage, the control unit 17 uses its integrated charging circuit 17A or charging function to maintain the capacitor 18 in a charged condition by applying a suitable charging voltage thereto from the on-board power supplied through the lines 11 and 12.

Figure 2:
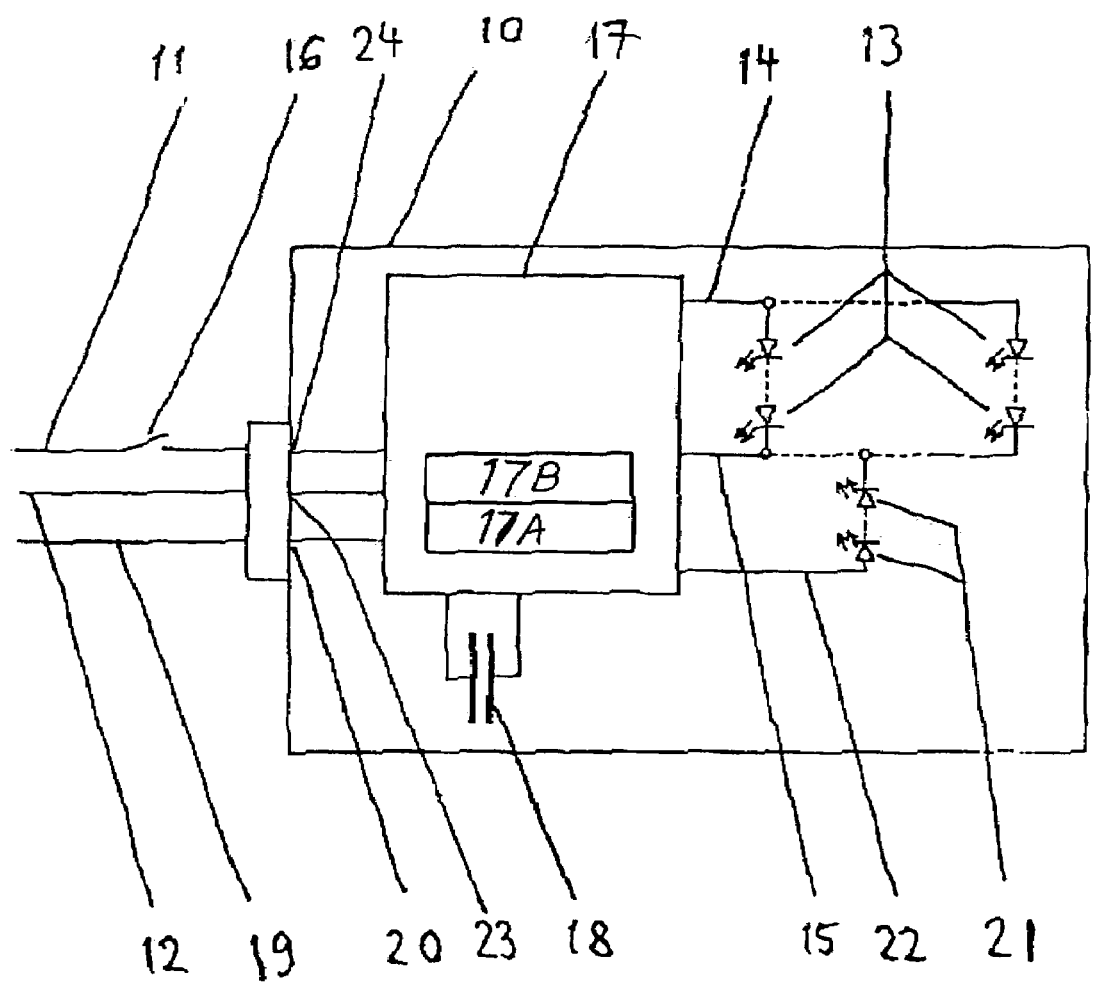
FIG. 2 is a schematic diagram of a single emergency light unit according to the invention.

While FIG. 2 merely symbolically indicates a single capacitor or capacitance 18, it should be understood that the overall capacitance/capacitor can be provided by arranging plural individual capacitors in series and/or in parallel with one another as needed. Throughout this application, the term capacitor is to be understood as encompassing any arrangement of one or more sub-units or sub-capacitors making up the overall capacitor.

In the event of a failure of the on-board power network 3, such that the on-board operating DC voltage is no longer available via the connection lines 11 and 12, the capacitor 18 will provide the necessary emergency operating power to achieve an emergency illumination of the emergency light unit 10. In this regard, the emergency light unit 10 further comprises at least one emergency lighting element or light emitting element 21, for example embodied as an LED 21, which is or are connected via the second internal power line 15 and a further third internal power line 22 to the control unit 17. The control unit 17 further includes a switching circuit 17B, which switches and connects the power available from the capacitor 18 via the power lines 15 and 22 to the emergency lighting elements 21 in an emergency mode, when a failure of the power supply network 3 is detected by the control unit 17.

For triggering or activating the emergency mode operation of the emergency light unit 10 via the control unit 17 thereof, the emergency light unit 10 may further comprise a control input 20 that is connected to a control signal line 19, which provides a signal indicating a failure of the on-board voltage supply. For this purpose, the signal line 19 is connected with the on-board power network 3. For example, the signal line 19 may carry a DC on-board operating voltage potential, for example 28 V. Upon the failure of the on-board power supply, the voltage of the signal line 19, for example, drops to zero, which is sensed by the control unit 17 of the emergency light unit 10.

Alternatively, the control unit 17 can sense the lack of operating voltage directly from the power line 11, without needing a separate signal line 19. In this alternative embodiment, rather than being provided in the 28 V line 11, the switch 16 may be provided in the 0 V line 12. Thereby the 28 V line 11 operates not only as a power supply line, but also as a signal line, so that the separate signal line 19 can be omitted. Namely, if the 28 V line 11 provides a continuous connection of the control unit 17 to the positive voltage of the on-board power supply network 3, then a failure of the on-board power supply can be directly detected by the control unit 17 via the line 11.

When the control unit 17 detects or registers a failure of the on-board power supply, e.g. through a drop or lack of the supply voltage through the line 11 or an optional additional signal line 19, then the control unit 17 switches the switching circuit 17B to connect the capacitor 18 to the internal power lines 15 and 22 supplying the emergency lighting elements 21. In this regard, the control unit 17 additionally has the function of an automatic electronic switch in the switching circuit 17B. Note that the second internal power line 15 may be a 0 V line common to the normal operation lighting elements 13 and the emergency lighting elements 21. On the other hand, the first internal power line 14 provides the normal operating power during normal operation as described above, and the third internal power line 22 provides the emergency operating power during emergency operation as described here.

During emergency operation, the emergency lighting elements 21 are powered by the electrical energy stored in the capacitor 18, whereby the capacitor 18 is discharged. The capacitor 18 has a sufficient storage capacity in order to operate the emergency lighting elements 21 for at least 5 minutes and preferably at least 10 minutes. This time duration is generally sufficient to allow the passengers or other persons to safely exit the aircraft. Preferably, the capacitor 18 has a capacitance of at least 2 F, preferably at least 5 F, for example about 10 F. The capacitor 18 may particularly, for example, be a so-called "Ultra-Cap". The emergency operating voltage provided by the capacitor 18 is preferably less than the normal on-board operating voltage of 28 V, and particularly preferably less than 15 V, for example around 6 V.

If a signal (e.g. a renewed provision of 28 V) becomes available via the signal line 19 or the power line 11 during the emergency operation, this indicates that the on-board power supply network 3 is again in normal operation. In that case, the control unit 17 senses the availability of the normal operating power, and correspondingly switches from the emergency operation back to the normal operation. Namely, the control unit 17 again recharges the capacitor 18 with a suitable charging voltage and suitable charging current from the normal operating power provided from the on-board power network 3 via the power supply connection lines 11 and 12, while selectively also powering the normal operation lighting elements 13 via the internal power lines 14 and 15.

In this normal operation, once again as described above, the control unit 17 or particularly its charging circuit 17A functions as a charging unit for the capacitor 18. The charging capacity is sufficiently small so as not to overload the on-board network 3, e.g. in the event that all of the emergency light units 10 are simultaneously charging their respective capacitors 18. In this regard, the charging capacity of the control unit 17 of a given emergency light unit 10 is preferably in the range less than 5 W. Depending on the charging current and the capacitance of the capacitor 18, the recharging process of the capacitor 18 can be carried out within a time of less than ten seconds, for example.

In the present example embodiment as described above, the control unit 17 and the capacitor 18 are respectively incorporated and integrated in a given emergency light unit 10. This significantly reduces and simplifies the installation effort. However, such integration is not absolutely necessary. In other words, the capacitor 18 and/or the control unit 17 does not need to be integrated in the respective associated emergency light unit 10, but instead could be provided separately and externally therefrom.

Figure 3:
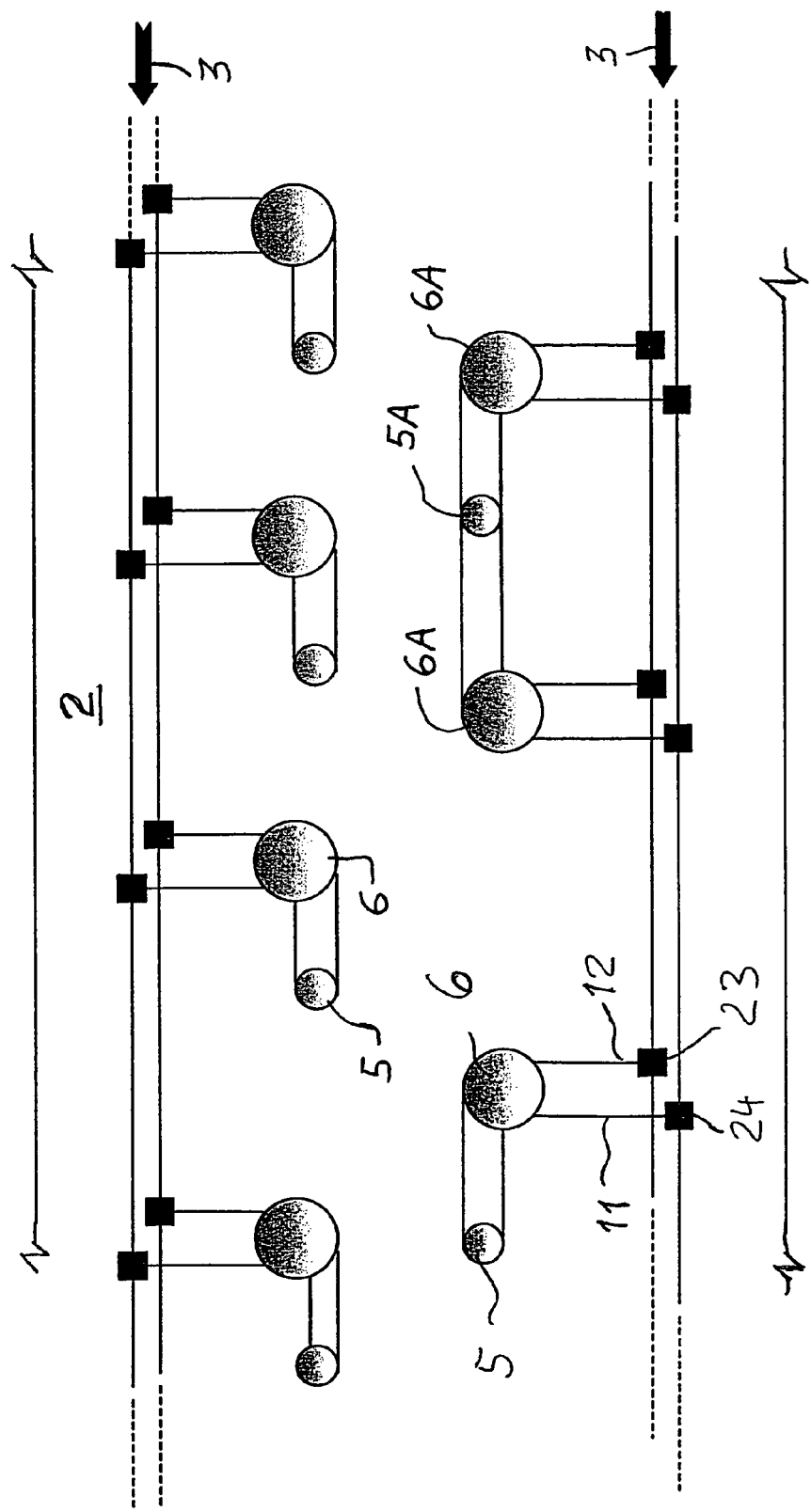
FIG. 3 is a schematic plan of a further embodiment of an emergency lighting arrangement according to the invention.

For example, the control unit 17 and the capacitor 18 could be combined together to form an emergency current unit 5 that is arranged separately from its associated emergency light unit 10. FIG. 3 schematically illustrates another example embodiment in which such an emergency current unit 5 is respectively externally arranged and connected to each emergency light unit 6. In this regard, the emergency light unit 6 can otherwise be a conventional emergency light unit. The respective emergency current unit 5 is arranged close to and connected to the For example, the control unit 17 and the capacitor 18 could be combined together to form an emergency current unit 5 that is arranged separately from its associated emergency light unit 10. FIG. 3 schematically illustrates another example embodiment in which such an emergency current unit 5 is respectively externally arranged and connected to each emergency light unit 6. In this regard, the emergency light unit 6 can otherwise be a conventional emergency light unit. The respective emergency current unit 5 is arranged close to and connected to the associated emergency light unit 6. It is alternatively possible that an individual emergency current unit 5 can be connected to more than one emergency light unit 6, for example the emergency current unit 5A being connected to a neighboring pair of emergency light units 6A. This embodiment makes it possible to use conventional emergency light units 6 while facilitating the retrofitting of emergency current sources 5 according to the invention.

Although the invention has been described with reference to specific example embodiments, it will be appreciated that it is intended to cover all modifications and-equivalents within the scope of the appended claims. It should also be understood that the present disclosure includes all possible combinations of any individual features recited in any of the appended claims.

What is claimed is:

1. In an aircraft having an on-board power supply network and a plurality of emergency light units arranged distributed in said aircraft, an improvement wherein:

each one of said emergency light units respectively comprises, incorporated therein as a unit, at least one normal operation light emitting element, at least one emergency light emitting element, at least one capacitor, and a controller that is connected to said power supply network, said at least one capacitor, and said at least one emergency light emitting element;

said controller is adapted to selectively switch between a normal mode when operating power is available from said power supply network and an emergency mode when said operating power is not available from said power supply network;

said normal operation light emitting element is connected directly or through said controller to said power supply network so as to be powered from said power supply network when said operating power is available;

said controller includes a charging circuit adapted to charge said at least one capacitor using said operating power in said normal mode; and said controller further includes a switching circuit adapted to disconnect said at least one emergency light emitting element from said at least one capacitor in said normal mode, and to connect said at least one emergency light emitting element to said at least one capacitor in said emergency mode so as to illuminate said at least one emergency light emitting element using power supplied from said at least one capacitor in said emergency mode.

2. An emergency lighting arrangement in an aircraft that includes an on board power supply network, said emergency lighting arrangement comprising:

a plurality of emergency light units arranged in a cabin of said aircraft, wherein each one of said emergency light units respectively includes, incorporated therein, at least one emergency light emitting element and at least one normal operation light emitting element; and a plurality of emergency current sources arranged in said cabin, wherein each one of said emergency current sources respectively includes at least one capacitor and a controller connected thereto;

wherein each one of said emergency current sources is respectively allocated and connected to said at least one emergency light emitting element of at most two of said emergency light units;

wherein, respectively with respect to each said emergency current source, said controller of said emergency current source is connected to said power supply network to detect whether operating power is available from said power supply network, and said controller of said emergency current source is arranged and adapted to automatically connect said at least one capacitor of said emergency current source to said at least one emergency light emitting element to which said emergency current source is allocated, so as to power said at least one emergency light emitting element with electrical energy stored in said at least one capacitor when. said operating. power is not available from said power supply network; and wherein said at least one normal operation light emitting element of each one of said emergency light units is connected to said power supply network and powered from said power supply network when said operating power is available.

3. The emergency lighting arrangement according to claim 2, wherein each respective one of said emergency current sources is respectively individually allocated to each one of said emergency light units.

4. The emergency lighting arrangement according to claim 3, wherein each one of said emergency light units respectively includes, incorporated therein, said respective one of said emergency current sources.

5. The emergency lighting arrangement according to claim 3, wherein each respective one of said emergency current sources is respectively externally connected to a respective individual one of said emergency light units.

6. The emergency lighting arrangement according to claim 2, wherein each respective one of said emergency current sources is respectively allocated to, and externally connected to, two of said emergency light units.

7. The emergency lighting arrangement according to claim 2, wherein each one of said emergency current sources respectively comprises a plurality of said capacitors connected in series with one another.

8. The emergency lighting arrangement according to claim 2, wherein said at least one capacitor in each one of said emergency current sources has a sufficient energy storage capacity to power said at least one emergency light emitting element connected thereto via said controller for at least 300 seconds.

9. The emergency lighting arrangement according to claim 2, wherein said at least one capacitor in each one of said emergency current sources has a sufficient energy storage capacity to power said at least one emergency light emitting element connected thereto via said controller for at least 600 seconds.

10. The emergency lighting arrangement according to claim 2, wherein each said at least one emergency light emitting element has an operating voltage less than an on-board supply voltage of said operating power of said power supply network.

11. The emergency lighting arrangement according to claim 2, wherein each said at least one emergency light emitting element respectively comprises a light emitting diode (LED).

12. The emergency lighting arrangement according to claim 2, wherein each respective one of said emergency current sources further includes a charging device connected to said at least one capacitor of said respective emergency current source and adapted to be connected to said power supply network, wherein said charging device is adapted to charge said at least one capacitor from said operating power of said power supply network.

13. The emergency lighting arrangement according to claim 12, wherein said charging device is incorporated in said controller of said respective emergency current source.

14. The emergency lighting arrangement according to claim 2, further comprising two power connection lines that connect each said controller to said power supply network.

15. The emergency lighting arrangement according to claim 14, further comprising a manually operable on-off switch interposed in a first one of said power connection lines.

16. The emergency lighting arrangement according to claim 15, wherein said first power connection line is adapted to carry a DC operating voltage of said operating power from said power supply network to said controller and a second one of said power connection lines is adapted to carry a zero volt reference potential, and further comprising a power fault signaling line that connects said controller to said operating voltage of said operating power.

17. The emergency lighting arrangement according to claim 15, wherein said first power connection line is adapted to carry a zero volt reference potential, and wherein said controller is adapted to detect the availability of said operating power directly via a second one of said power connection lines which is adapted to carry a DC operating voltage of said operating power.

18. The emergency lighting arrangement according to claim 2, wherein a respective one of said emergency current sources is allocated to and externally connected to only a neighboring pair of said emergency light units.

19. The emergency lighting arrangement according to claim 2, completely omitting and excluding any and all rechargeable batteries connected to said at least one emergency light emitting element for powering said at least one emergency light emitting element.

20. An emergency lighting arrangement in an aircraft that includes an on-board power supply network, said emergency lighting arrangement comprising:
   a signal line adapted to provide a signal indicating a failure of said on-board power supply network;
   an emergency power source comprising at least one power storage capacitor, which is connected at least indirectly to said on-board power supply network to be charged by power from said on-board power supply network in a normal operating mode when power is available from said on-board power supply network;
   normal operation light emitting elements, which are connected at least indirectly to said on-board power supply network to be powered by power from said on-board power supply network in said normal operating mode; and
   at least one emergency light unit that comprises emergency light emitting elements, and a controller that is connected to said on-board power supply network, said signal line, said emergency light emitting elements, and said normal operation light emitting elements;
   wherein said controller is adapted to detect said failure of said on-board power supply network and in response thereto to automatically connect said emergency light emitting elements with said power storage capacitor so as to power said emergency light emitting elements.

* * * * *

UNITED STATES PATENT AND TRADEMARK OFFICE
CERTIFICATE OF CORRECTION

PATENT NO. : 7,378,989 B2
APPLICATION NO. : 11/027562
DATED : May 27, 2008
INVENTOR(S) : Wisch et al.

It is certified that error appears in the above-identified patent and that said Letters Patent is hereby corrected as shown below:

On the Title page,
Item (*), Notice,
replace "129" by --48--;

Column 7, Line 65 to Column 8, Line 7,
after "connected to the", delete "For example, the control unit 17 and the capacitor 18 could be combined together to form an emergency current unit 5 that is arranged separately from its associated emergency light unit 10. FIG. 3 schematically illustrates another example embodiment in which such an emergency current unit 5 is respectively externally arranged and connected to each emergency light unit 6. In this regard, the emergency light unit 6 can otherwise be a conventional emergency light unit. The respective emergency current unit 5 is arranged close to and connected to the";

Column 8,
Line 18, after "modifications", replace "and-equivalents" by --and equivalents--;
Line 57, after "includes an", replace "on board" by --on-board--;

Column 9,
Line 16, after "when", delete --.--;
Line 17, after "operating", delete --.--.

Signed and Sealed this

Sixth Day of October, 2009

David J. Kappos
*Director of the United States Patent and Trademark Office*